United States Patent
Nolan

(10) Patent No.: US 9,656,526 B2
(45) Date of Patent: May 23, 2017

(54) GROUND VEHICLE WITH FLIGHT CAPABILITY

(71) Applicant: Paragrine Systems, LLC, San Diego, CA (US)

(72) Inventor: Robert Nolan, Virginia Beach, VA (US)

(73) Assignee: Paragrine Systems, LLC, San Diego, CA (US)

( * ) Notice: Subject to any disclaimer, the term of this patent is extended or adjusted under 35 U.S.C. 154(b) by 0 days.

(21) Appl. No.: 14/480,061

(22) Filed: Sep. 8, 2014

(65) Prior Publication Data

US 2015/0266349 A1    Sep. 24, 2015

Related U.S. Application Data

(60) Provisional application No. 61/874,451, filed on Sep. 6, 2013.

(51) Int. Cl.
| | |
|---|---|
| *B60F 5/02* | (2006.01) |
| *B62D 57/04* | (2006.01) |
| *B64C 37/00* | (2006.01) |
| *B62D 21/18* | (2006.01) |
| *B62D 33/06* | (2006.01) |
| *B64C 31/036* | (2006.01) |

(52) U.S. Cl.
CPC ............. *B60F 5/02* (2013.01); *B62D 21/183* (2013.01); *B62D 33/0625* (2013.01); *B62D 57/04* (2013.01); *B64C 31/036* (2013.01); *B64C 37/00* (2013.01)

(58) Field of Classification Search
CPC ..... B64C 31/00; B64C 31/028; B64C 31/036; B64C 37/00; B60F 5/02; B62D 57/04
See application file for complete search history.

(56) References Cited

U.S. PATENT DOCUMENTS

| | | | | |
|---|---|---|---|---|
| 2,619,301 | A | * | 11/1952 | Hall ........................ B60F 5/02 244/2 |
| 2,623,712 | A | * | 12/1952 | Spratt ..................... B64C 3/385 244/231 |
| 2,843,145 | A | * | 7/1958 | Koehler .................. F16K 31/34 137/414 |
| 3,135,483 | A | * | 6/1964 | Girard ................... B64C 31/032 244/138 R |
| 3,361,388 | A | * | 1/1968 | Girard ................... B64C 31/032 244/48 |
| 3,383,078 | A | | 5/1968 | Shohet et al. |

(Continued)

*Primary Examiner* — Tien Dinh
*Assistant Examiner* — Michael Wang
(74) *Attorney, Agent, or Firm* — Tanner IP, PLLC

(57) ABSTRACT

Ground vehicles that may include flight capability are described. In some examples, a vehicle frame may include a fuel tank with a main tank and at least two auxiliary tanks, with the main tank disposed substantially along the centerline of the vehicle, and the at least two auxiliary tanks extending upward and outward from the main tank. In some examples, vehicles may include a chassis, a cage attached to the chassis, a front wheelbase attached to the chassis and/or cage, a rear wheelbase attached to the chassis and/or cage, a ground steering mechanism connected to the front wheelbase and/or the rear wheelbase, a motor connected to a propeller, and a propeller shroud at least partially encircling the propeller.

18 Claims, 22 Drawing Sheets

(56) References Cited

U.S. PATENT DOCUMENTS

| | | | | |
|---|---|---|---|---|
| 3,778,011 | A | 12/1973 | Cannon | |
| 4,432,515 | A | 2/1984 | Jarvineva | |
| 4,601,443 | A * | 7/1986 | Jones | B64D 17/025 244/13 |
| 4,657,207 | A * | 4/1987 | Poling | B60F 5/02 180/7.4 |
| 4,715,417 | A | 12/1987 | Coloney | |
| 4,860,972 | A | 8/1989 | Lannerd et al. | |
| 4,875,642 | A * | 10/1989 | Flynn | B64C 31/024 244/13 |
| 4,930,724 | A * | 6/1990 | Snyder | B64C 31/036 244/13 |
| 4,934,630 | A * | 6/1990 | Snyder | B64C 31/036 244/13 |
| 5,160,100 | A * | 11/1992 | Snyder | B64C 31/036 244/13 |
| 5,190,441 | A * | 3/1993 | Murphy | B64C 11/008 415/119 |
| 5,836,541 | A | 11/1998 | Pham | |
| 6,360,991 | B1 * | 3/2002 | Alan | B64C 25/06 244/100 R |
| 6,676,084 | B2 * | 1/2004 | Asseline | A63H 27/08 244/152 |
| 6,776,374 | B2 * | 8/2004 | LaSee | B64D 17/40 244/139 |
| 6,877,690 | B1 * | 4/2005 | Bragg | B60F 5/02 244/2 |
| 7,066,426 | B2 * | 6/2006 | Preston | B60F 5/006 244/13 |
| D583,293 | S * | 12/2008 | Frost | D12/319 |
| 7,857,260 | B2 | 12/2010 | Morgia et al. | |
| 7,874,512 | B2 * | 1/2011 | Xu | B60F 5/02 244/2 |
| 8,528,852 | B2 * | 9/2013 | Farrag | B60F 5/02 244/120 |
| 2002/0193914 | A1 * | 12/2002 | Talbert | B64C 13/50 701/3 |
| 2005/0230521 | A1 * | 10/2005 | Medsker | B64C 31/0285 244/13 |
| 2005/0247819 | A1 * | 11/2005 | Caruso | B60F 5/02 244/2 |
| 2007/0023566 | A1 * | 2/2007 | Howard | B60F 5/02 244/2 |
| 2007/0272793 | A1 * | 11/2007 | Botelho | B64C 31/028 244/16 |
| 2012/0111417 | A1 | 5/2012 | Smith et al. | |
| 2013/0211173 | A1 | 8/2013 | Eckholm, II et al. | |

* cited by examiner

GROUND VEHICLE WITH FLIGHT CAPABILITY

RELATED APPLICATIONS

This application claims priority to U.S. Provisional Application No. 61/874,451 filed Sep. 6, 2013, the contents of which are hereby incorporated by reference in their entirety.

BACKGROUND OF THE INVENTION

The present invention generally relates to novel configurations that can be advantageously used in a vehicle, e.g. a vehicle having ground and/or flight capability.

There is an ongoing need for vehicles having powered ground and flight mobility. Such designs are of interest, for example, in military, border enforcement, and many other governmental and civilian activities. Historically, efforts to incorporate robust ground mobility and sustainable flight have met with extremely limited success based on various factors including, for example, the often contrary design parameters of ground and aerial vehicles.

The present subject matter overcomes at least some aspects of the historical challenges in this area by providing novel configurations related to, for example, fuel tank and frame designs, air and ground steering mechanisms, suspension systems, and propeller shrouds, that can be advantageously incorporated in the structural design of a vehicle in ways that improve both the ground mobility and flight capability of the vehicle.

BRIEF SUMMARY OF THE INVENTION

According to first aspects of the invention, a vehicle may include one or more of a chassis; a cage attached to the chassis; a front wheelbase attached to the chassis and/or cage; a rear wheelbase attached to the chassis and/or cage; a ground steering mechanism connected to the front wheelbase and/or the rear wheelbase; a motor connected to a propeller; and/or a propeller shroud at least partially encircling the propeller.

In embodiments, the vehicle may be a ground vehicle. In embodiments, the vehicle may be a ground vehicle with flight capability.

Embodiments may include a removable airfoil configured to attach to, and detach from, the cage.

In embodiments, the vehicle may be configured for powered ground locomotion using the propeller with the airfoil detached, and configured for powered flight using the propeller with the airfoil attached.

In embodiments, the propeller may be the exclusive source of thrust for the powered ground locomotion and the powered flight.

Embodiments may include an air steering mechanism with an attachment for connection to the airfoil.

In embodiments, the air steering mechanism may include left and right steering pedals that may be rotatatably secured at a top end of the pedals, and that are angled in toward a centerline of the vehicle.

In embodiments, the air steering mechanism may include left and right steering pedals that may be angled in toward a centerline of the vehicle.

In embodiments, the left and right steering pedals may be angled in toward the centerline of the vehicle in a range of 5° to 45° off vertical, in a range of 10° to 30° off vertical, or about 20°.

In embodiments, the air steering mechanism may include left and right steering pedals and attachments for connection to the airfoil may be disposed at the bottoms of the pedals.

In embodiments, the attachment may include a pulley.

In embodiments, the air steering mechanism may include left and right steering lines that are each connected to the chassis and the airfoil, each steering line running through a pulley connected to the steering pedals.

In embodiments, the air steering mechanism may include a trim system configured to shorten an overall length of one or more of the steering lines.

In embodiments, the ground steering mechanism may include a rack and pinion steering for front wheels of the vehicle.

In embodiments, the ground steering mechanism may include a locking mechanism for temporarily preventing the front wheels from steering.

In embodiments, the locking mechanism releasably locks the front wheels in a straight steering direction.

In embodiments, the propeller shroud may include a hinge for folding the propeller shroud, preferably to about half the overall diameter.

In embodiments, the propeller shroud has a diameter in a range or 1.0 to 3.0 inches larger than the propeller diameter, or approximately 1.5 inches larger than the propeller diameter. (protects prop from ground debris, reduces propeller tip noise)

In embodiments, the propeller shroud has a diameter in a range of approximately 70 inches to 80 inches, or approximately 74 inches.

In embodiments, the propeller shroud has a depth in a range of 3 inches to 8 inches, or about 6 inches.

In embodiments, the propeller shroud may be disposed in a plane that is non-parallel to the plane of the propeller's rotation.

In embodiments, the plane of the propeller shroud and the plane of the propeller's rotation may be offset in a range of 2° to 5° along at least one axis.

In embodiments, the plane of the propeller shroud and the plane of the propeller's rotation may be offset in a range of 2° to 5° along at least two axes.

In embodiments, the propeller shroud may be fixed to the chassis at the base of the propeller shroud.

In embodiments, the propeller shroud may include an elongated support member configured to attach to the cage, preferably at or near the apex of the propeller shroud.

Embodiments may include auxiliary support members attached to the propeller shroud in proximity to the hinge and to the chassis and/or cage.

In embodiments, the auxiliary support members include one of a wing, tear-drop or tapered cross section.

In embodiments, the propeller may be bent at the ends, and the bent ends of the propeller do not extend beyond the propeller shroud. (ducted fan, propeller tip noise)

In embodiments, the propeller's axis of rotation may be non-parallel with the centerline of the vehicle.

In embodiments, the propeller's axis of rotation may be offset in a range of 2° to 5° left or right of the centerline of the vehicle.

In embodiments, the propeller's axis of rotation may be offset in a range of 2° to 5° up or down of the centerline of the vehicle.

In embodiments, the propeller's axis of rotation may be offset to provide additional downward force on the front wheelbase.

In embodiments, the propeller's axis of rotation may be offset to provide a corrective force to engine torque and/or P factor.

In embodiments, the center of thrust of the propeller may be about 4½ feet over the bottom of the wheels, over 50% of the vehicle's height, preferably 60-80% of the vehicle's height or about 70% of the vehicle's height.

In embodiments, the airfoil may be a ram-air airfoil, preferably a ram-air elliptical airfoil.

In embodiments, the airfoil may include a stiffener to reinforce a leading edge of the airfoil.

In embodiments, the chassis may include a central support extending along the centerline of the vehicle (e.g. similar to a backbone chassis), and the cage may include two elongated auxiliary supports that are connected to the central support at both ends of the central support.

In embodiments, the auxiliary supports form a "V" shape and may be joined to the central support at the base of the "V" when viewed from the front of the vehicle.

In embodiments, the auxiliary supports may be substantially arc-shaped.

In embodiments, an apex of the arcs (or highest point of the arcs with respect to the height of the vehicle), may be located at about 40-60%, preferably about 50%, of the length of the vehicle, and/or a length of the arc.

In embodiments, the central support and the arc-shaped supports may be substantially tubular.

In embodiments, each of the auxiliary supports include fuel reservoirs in fluid communication with a fuel reservoir in the central support, the fuel reservoir in the central support in further fluid communication with the motor.

In embodiments, each of the auxiliary supports may include an attachment mechanism configured to attach to an airfoil suspension.

In embodiments, the airfoil suspension may include a plurality of support cables (e.g. shroud lines) extending between the auxiliary supports and a ram-air airfoil.

Embodiments may include elongated structural members that further connect the auxiliary supports to the central support, wherein each of the auxiliary supports may be connected to one of the structural members at, or about, the attachment mechanism such that a lift force from the airfoil suspension is distributed to the central support during flight.

In embodiments, the elongated structural members may be connected to the central support forward of the attachment mechanism.

In embodiments, the elongated structural members may be connected between the attachment mechanism and the central support at an angle closely approximating an average angle that the support cables assume with respect to the vehicle in flight.

Embodiments may include a windshield mounted between the auxiliary supports.

In embodiments, the auxiliary supports and the central support each extend along at least 75%, 80%, 85% or 90% of the length of the vehicle.

In embodiments, the front and/or rear wheelbases include a shock absorbing mechanism attached to the elongated structural members.

In embodiments, the shock absorbing mechanism may be configured to transition between an active configuration and an inactive configuration, whereby the overall height of the vehicle can be reduced by about 12-20 inches, or about 16 inches.

In embodiments, the chassis may include a central support extending along the centerline of the vehicle (e.g. similar to a backbone chassis), and the cage may include two elongated auxiliary supports that may be connected to the central support at both ends of the central support.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
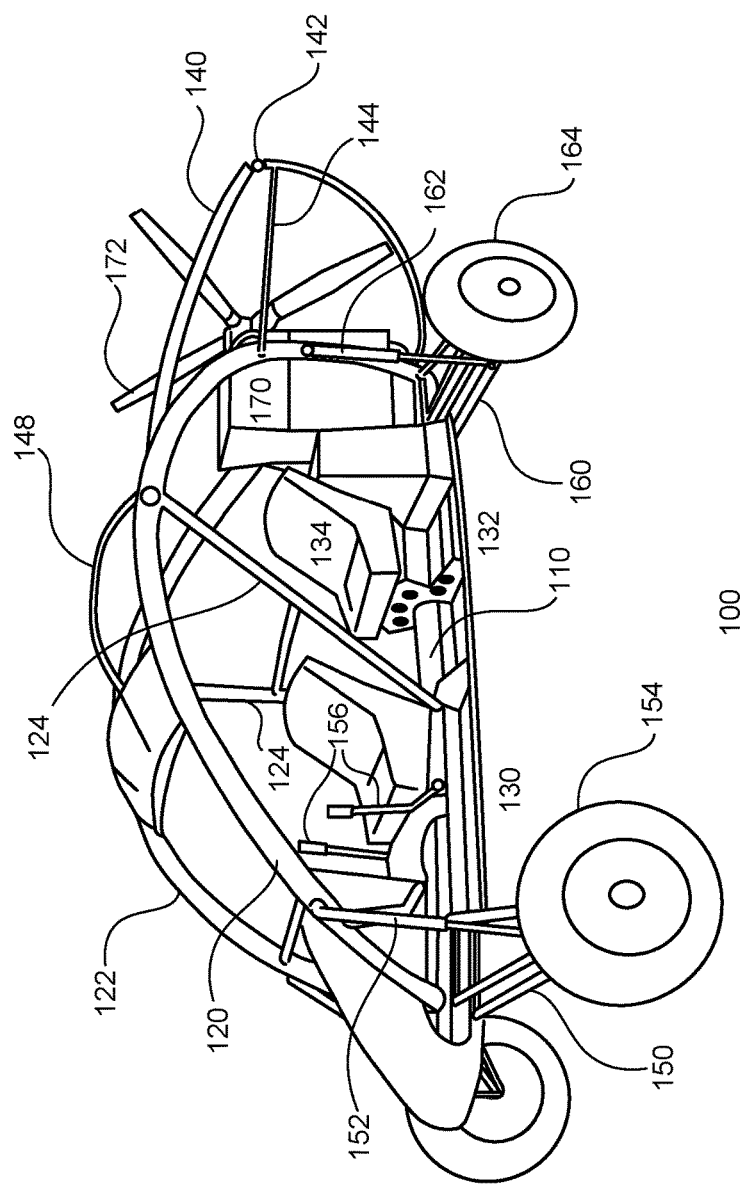
FIG. 1 depicts a left side view of an exemplary vehicle that may be configured for powered ground mobility and/or flight capability according to aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a support member" is a reference to one or more support members and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1 shows a partially assembled vehicle 100 including an integral frame/fuel tank 110 with a main tank and two auxiliary tanks 120, 122. In particular, the main tank 110 forms at least part of the backbone chassis, and the auxiliary tanks 120, 122 form at least part of a cage extending above the backbone chassis. In some embodiments, the vehicle chassis and/or cage may be configured as fuel tanks (such as the embodiment shown in FIG. 1). Accordingly, various features relevant to the vehicle chassis and/or cage may be discussed below with reference to a "main tank" and/or one or more "auxiliary tanks." However, it should be understood that the invention is not necessarily limited to embodiments in which the vehicle chassis and/or cage are configured as fuel tanks, and may encompass embodiments in which the described vehicle chassis, cage, main tank and/or one or more auxiliary tanks, are structural members without any fuel storage capacity.

FIG. 1 also shows a pilot cockpit 130 and a cargo/passenger area 132, disposed over the main tank 110 and between the two auxiliary tanks 120, 122. In embodiments, the cargo area 132 may include a removable rear seat 134.

The vehicle shown in FIG. 1 includes a chassis, in this case a backbone chassis with a front wheelbase and a rear wheelbase. The vehicle also includes a cage attached to the chassis at various points, e.g. at the ends of the backbone chassis, and around the middle of the backbone chassis via additional supports 124 that extend from about the apex of the cage to the backbone chassis. The cage is also attached to the front wheelbase and the rear wheelbase via front and rear suspension systems 150, 160, respectively. A ground steering mechanism is attached to the front wheels 154 and includes left and right steering levers 156 on either side of the cockpit 130.

As shown in FIG. 1, the auxiliary supports or tanks 120, 122 may be substantially arc-shaped and extend along in excess of 80% of the length of the vehicle 100 and up to 80% or more of the height of the vehicle 100. In embodiments, the central support or main tank 110, and the auxiliary supports or tanks 120, 122, may extend along at least 75%, 80%, 85% or 90% of length of the vehicle 100.

The vehicle 100 shown in FIG. 1 also includes a rear-mounted motor 170 connected to a propeller 172, e.g. via a gear reduction mechanism, and a propeller shroud 140 at least partially encircling the propeller 172. In the view shown in FIG. 1, the propeller shroud 140 is folded to reduce the overall height of the vehicle.

In embodiments, the propeller shroud 140 may include a hinge 142 for folding the propeller shroud, preferably to about half the overall diameter. The ring-shaped propeller shroud 140 may be attached to the main tank 110 and the auxiliary tanks 120, 122, and may be configured to allow the propeller shroud 140 to be collapsed to about 60% of its overall diameter. In embodiments, the propeller shroud may be collapsed to about 50% of its overall diameter, e.g. by folding toward the front or rear of the vehicle. In embodiments, the propeller shroud 140 may have a diameter in a range of approximately 70 inches to 80 inches, or approximately 74 inches.

In embodiments, the propeller shroud 140 has a diameter in a range or 1.0 to 3.0 inches larger than the propeller 172 diameter, or approximately 1.5 inches larger than the propeller diameter. In embodiments, the propeller shroud 140 has a depth in a range of 3 inches to 8 inches, or about 6 inches. Such dimensions have been found by the inventor to provide benefits including, for example, protecting the propeller from ground debris, and reducing propeller tip noise.

Figure 21:
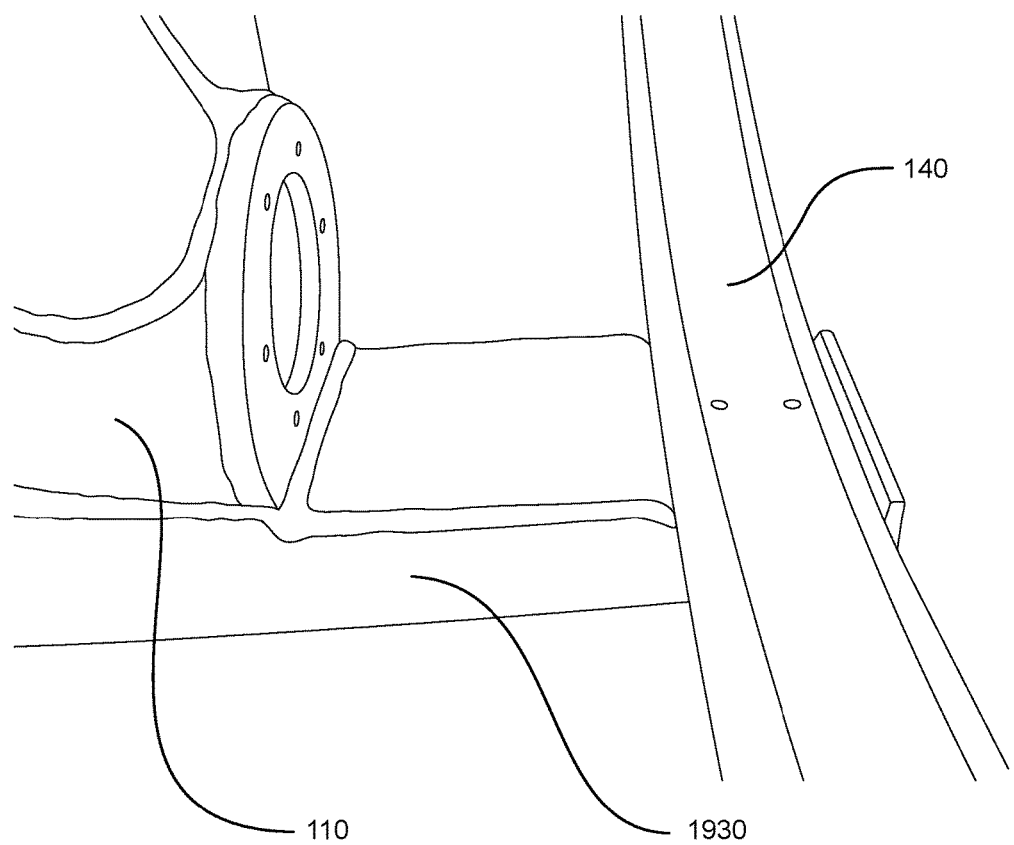
FIG. 21 depicts details of a frame portion and propeller shroud according to aspects of the invention.

In embodiments, the propeller shroud 140 may be disposed in a plane that is non-parallel to the plane of the propeller's rotation. For example, the plane of the propeller shroud 140 and the plane of the propeller's rotation may be offset in a range of 2° to 5° along at least one axis, or the plane of the propeller shroud 140 and the plane of the propeller's rotation may be offset in a range of 2° to 5° along at least two axes, In embodiments, the propeller shroud 140 may be fixed to the chassis at the base of the propeller shroud, such as shown in FIG. 21.

Figure 2:
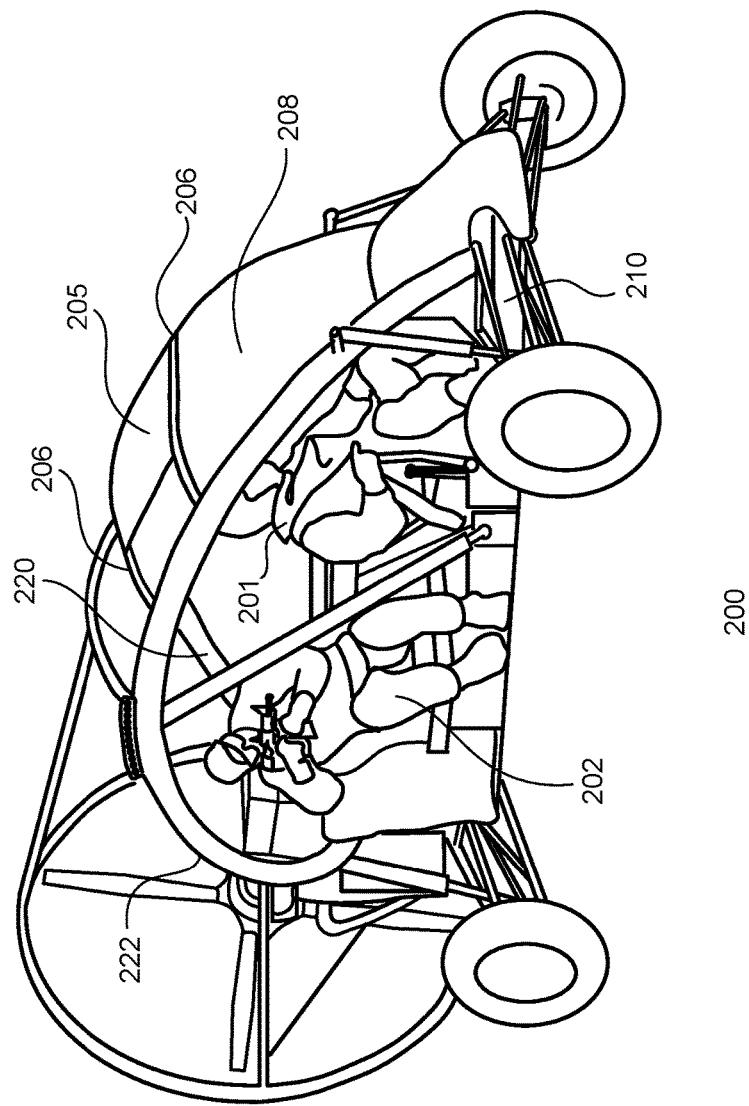
FIG. 2 depicts a right side view of an exemplary vehicle that may be configured for powered ground mobility and/or flight capability according to aspects of the invention.
Figure 3:
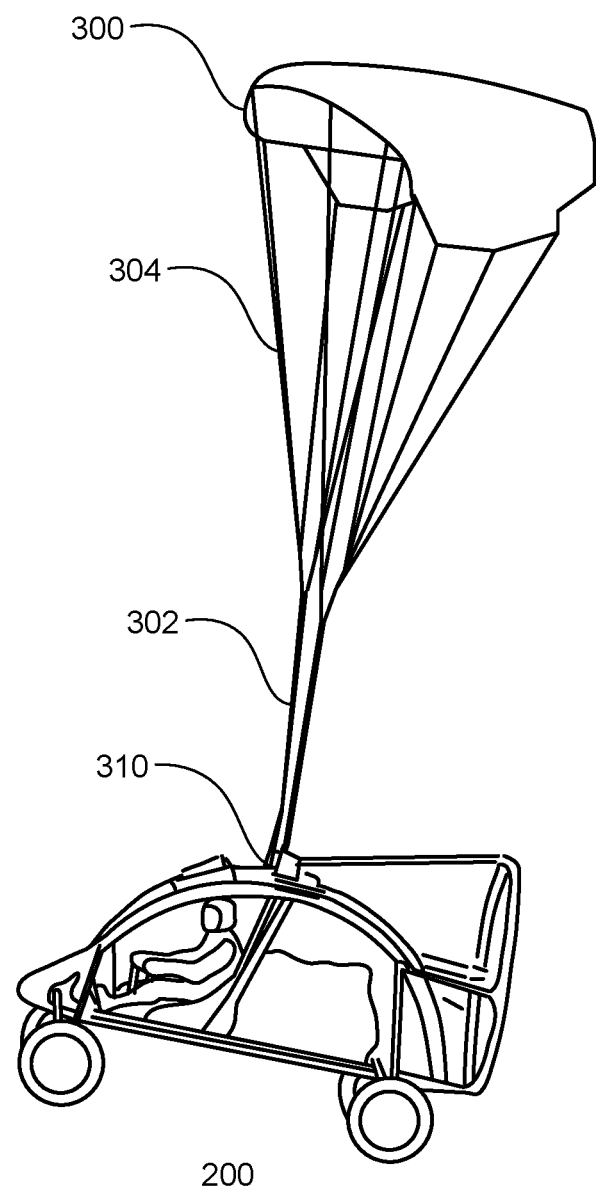
FIG. 3 depicts a left side view of an exemplary vehicle according to aspects of the invention in flight.
Figure 19:
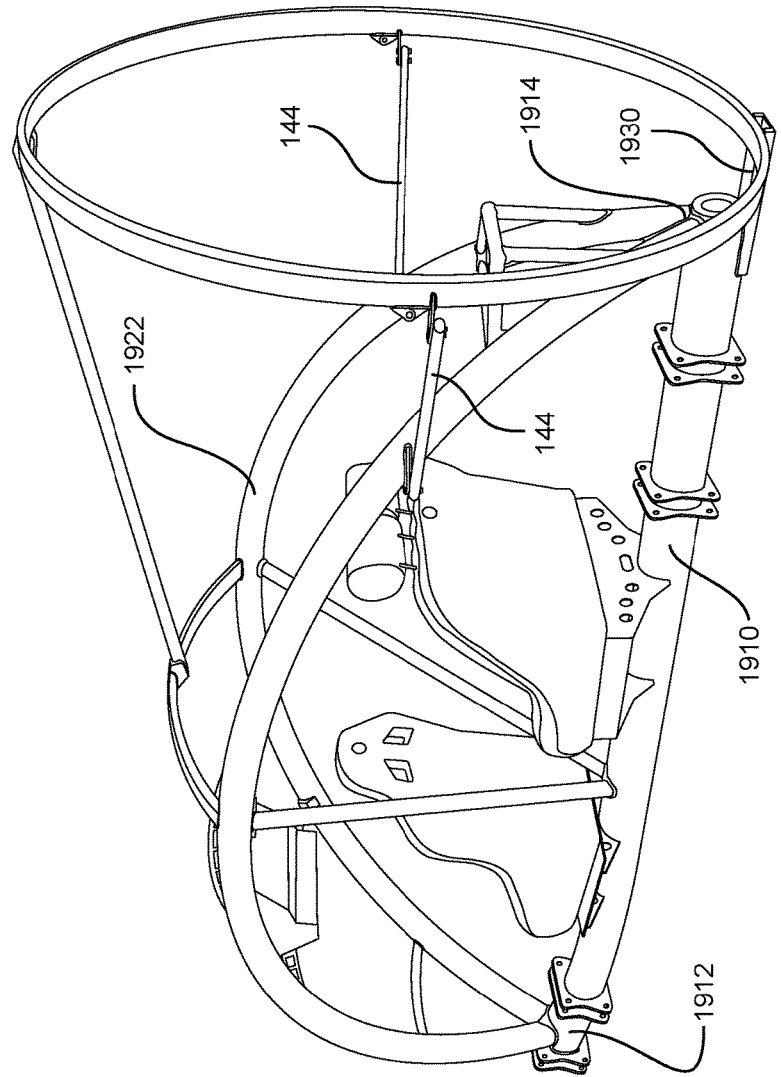
FIG. 19 depicts a rear-left view including details of a frame, supplemental supports, engine mount, and propeller shroud of an exemplary vehicle according to aspects of the invention.

In embodiments, the propeller shroud 140 may include an elongated support member configured to attach to the cage, preferably at or near the apex of the propeller shroud, such as shown in FIGS. 2, 3 and 19.

Embodiments may include auxiliary support members 144 attached to the propeller shroud 140 in proximity to the hinge 142 and to the cage and/or chassis, such as shown in FIGS. 1-3, and 19. In embodiments, the auxiliary support members 144 may include one of a wing, tear-drop or tapered cross section. Such configurations have been found by the inventor to improve, for example, the overall thrust/ airflow provided through the propeller shroud.

In embodiments, the propeller 172 may be bent at the ends, and the bent ends of the propeller do not extend beyond the propeller shroud 140. Such configurations may provide a ducted fan effect, reduce propeller tip noise, and other advantages.

In embodiments, the propeller's axis of rotation may be non-parallel with the centerline of the vehicle 100. For example, the propeller's axis of rotation may be offset in a range of 2° to 5° left or right of the centerline of the vehicle 100, or offset in a range of 2° to 5° up or down of the centerline of the vehicle 100. In this regard, the inventor has found that offsetting the propeller's axis of rotation may provide additional downward force on the front wheelbase, and/or a corrective force to engine torque and/or P factor.

In embodiments, the center of thrust of the propeller may be about 4½ feet over the bottom of the wheels 164, over 50% of the vehicle's height, preferably 60-80% of the vehicle's height or about 70% of the vehicle's height.

FIG. 1 also shows an example of how the main tank 100 and auxiliary tanks 120, 122 may be connected to and/or with a front wheel suspension 150 and a rear wheel suspension 160.

In the embodiment shown in FIG. 1, the main tank 110 is configured as a load-bearing frame (i.e. a backbone chassis) for the front and rear wheel suspensions 150, 160, and the auxiliary tanks 120, 122 are configured as a load-bearing frame for an airfoil suspension, described further below.

In the embodiment shown in FIG. 1, the front and rear wheel suspensions 150, 160, include a shock absorbing mechanism 152, 162 attached to the auxiliary tanks 120, 122.

In the embodiment shown in FIG. 1, the shock absorbing mechanism 152, 162 is configured to transition between an active configuration and an inactive or transport configuration, whereby the overall height of the vehicle 100 can be reduced by about 16 inches. However, other embodiments may include configurations whereby the overall height of the vehicle may be adjusted, for example, by about 12-20 inches.

FIG. 2 shows a more fully assembled vehicle 200 based on the assembly of FIG. 1, that is configured for powered ground mobility using only the propeller at the rear of the vehicle. A pilot/driver 201 is shown in the cockpit and passengers 202 are shown in the cargo/passenger area.

In the embodiment shown in FIG. 2, the main tank 210 and the two auxiliary tanks 220, 222 form the primary longitudinal support frames for the vehicle. Additionally, an overhead control panel 205 is shown disposed at least partially above the cockpit and between the at least two auxiliary tanks 220, 222. The overhead control panel 205 may include, for example, one or more of electrical hard point controls, circuit breakers, engine monitors, atmospheric indicators, performance indicators, etc. The overhead control panel 205 may also include one or more structural supports 206 connecting the at least two auxiliary tanks 220, 222, as discussed further below.

In embodiments, the overhead control panel 205 may be disposed approximately 50-70 degrees over the approximate location of the pilot's head.

FIG. 2 also shows a windshield 208 attached to, and substantially between, the auxiliary tanks 220, 222, in front of the driver/pilot 201.

FIG. 3 shows an in-flight picture of the vehicle 200 shown in FIG. 2, including an attached airfoil 300. This provides an example of the frame shown in FIG. 1 being integrated into a ground vehicle with flight capability. As can be seen in FIG. 3, the airfoil 300 is attached to the vehicle 200 via an attachment mechanism (e.g. a parachute attachment point 310), at or near the apex of the auxiliary tanks. As used herein, the apex of the auxiliary tanks may be understood as the location along the auxiliary tanks corresponding to a maximum height with respect to the height of the vehicle. The airfoil 300 shown in FIG. 3 may be a removable airfoil configured to attach to, and detach from, the cage.

Considering the views shown in FIGS. 2 and 3, it may be understood how exemplary embodiments may include the features whereby the ground vehicle has flight capability, at least the main tank is configured as a load-bearing frame for the front and rear wheel suspensions, and at least the auxiliary tanks are configured as a load-bearing frame for the airfoil suspension.

In the embodiment shown in FIGS. 2 and 3, it may also be seen that the vehicle can be configured for powered ground locomotion using the propeller with the airfoil detached, and configured for powered flight using the propeller with the airfoil attached. In embodiments, the propeller may be the exclusive source of thrust for the powered ground locomotion and the powered flight.

Figure 4:
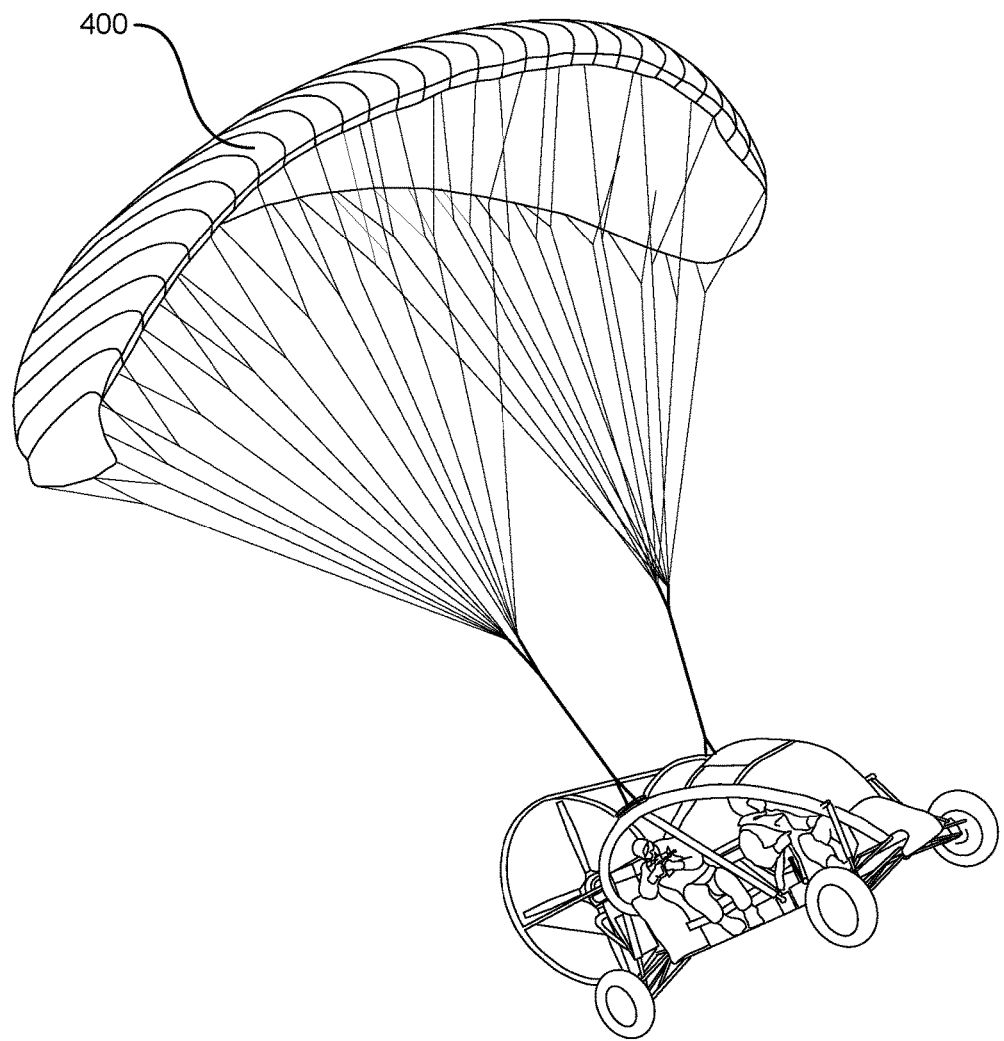
FIG. 4 depicts a right side view of an exemplary vehicle according to aspects of the invention in flight.

FIG. 4 shows another in-flight picture of the vehicle shown in FIG. 3, including an elliptical ram-air airfoil 400. Such airfoils have been found effective in implementing the present invention, and can provide up to 35% additional lift, with reduced surface area.

In embodiments, the airfoil may include a stiffener to reinforce a leading edge of the airfoil. Stiffeners may be applied, for example, to the upper camber, front edge, lower camber, vertical cells leading edge of the airfoil. The inventor has found that with such stiffeners, the vehicle is able to fly faster while maintaining the airfoil shape. In embodiments, the airfoil may be attached to A, B, C, D lines, with the strength of the A, B lines increased by about 18% relative to the C and D lines.

Figure 5:
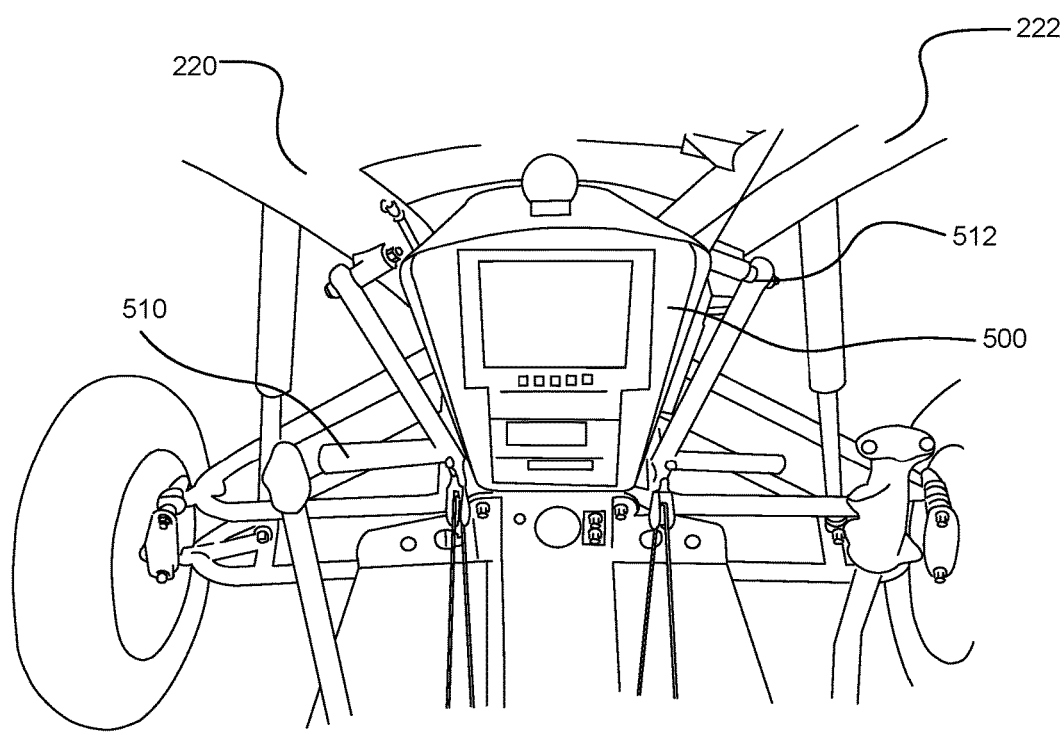
FIG. 5 depicts details of a control console, air steering mechanism and front suspension of an exemplary vehicle according to aspects of the invention.
Figure 6:
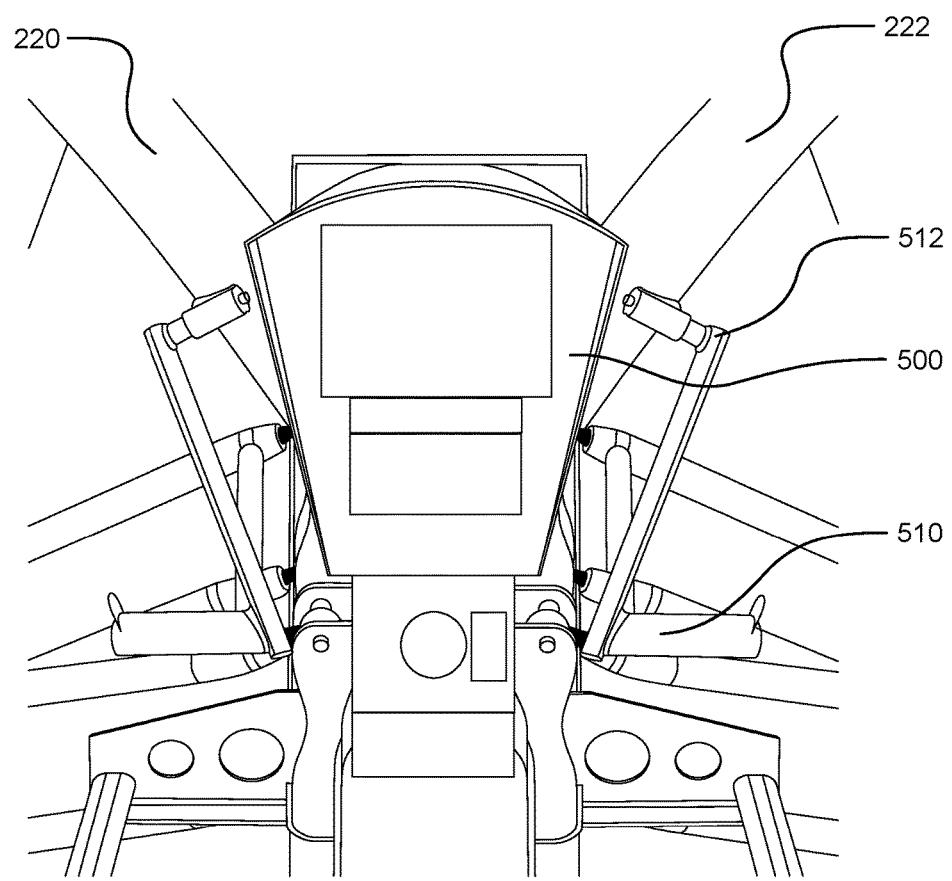
FIG. 6 depicts a details of a control console, air steering mechanism and front suspension of an exemplary vehicle according to aspects of the invention.

FIGS. 3 and 4 also show an example of how the airfoil suspension may include a plurality of support cables (e.g. shroud lines 302, 304) extending between the auxiliary supports and a ram-air airfoil 300. Embodiments may further include a plurality of steering lines attached to the airfoil, as discussed further below FIGS. 5 and 6 show further details of an avionics suite 500 mounted to and over the main tank, as well as air steering pedals 510 mounted to the auxiliary tanks 220, 222. In embodiments, the air steering pedals 510 may be mounted to the auxiliary tanks and may angle inward toward a centerline of the vehicle from their attachment points.

In the embodiment shown in FIG. 5, the left and right steering pedals 510 are rotatably secured at a top end of the pedals 512 to the cage/auxiliary tanks, and are angled in toward a centerline of the vehicle. In embodiments, the left and right steering pedals may be angled in toward the centerline of the vehicle in a range of 5° to 45° off vertical, in a range of 10° to 30° off vertical, or about 20°. The inventor has found significant advantages in such configurations, for example, in applying and maintaining necessary air steering forces via the pilot's legs during aerial maneuvers.

Figure 7:
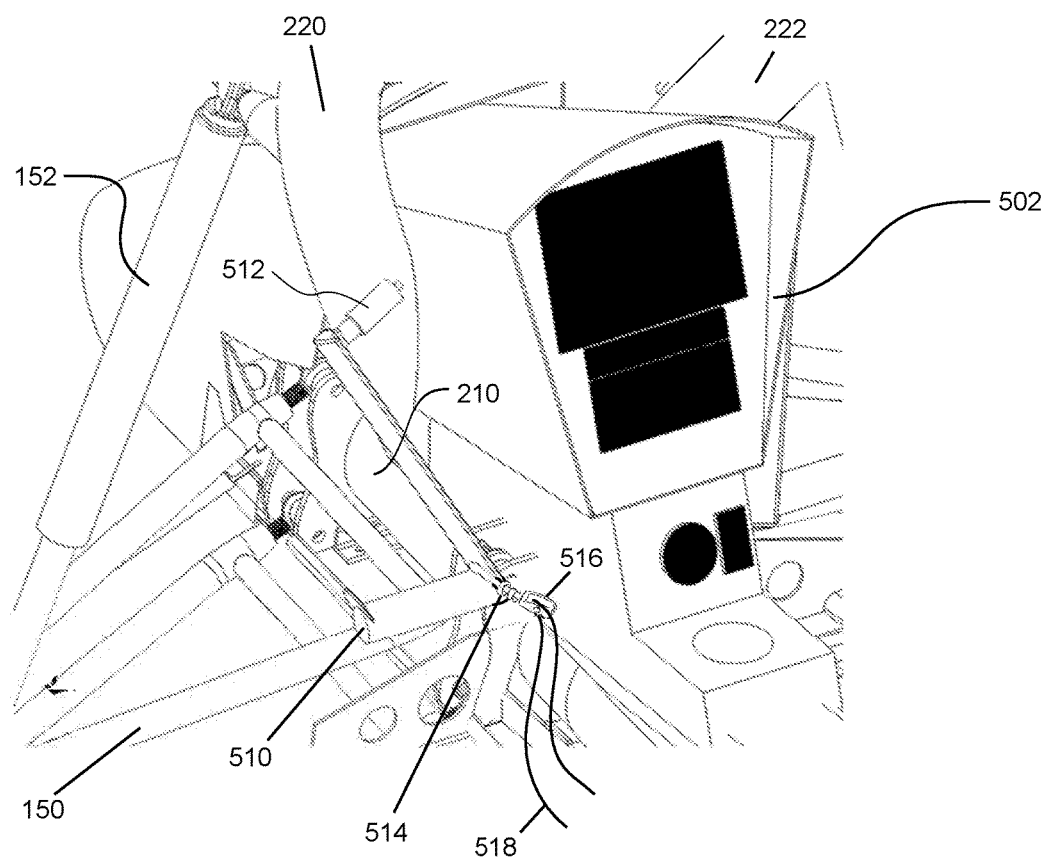
FIG. 7 depicts a left side view including details of a control console, air steering mechanism and front suspension of an exemplary vehicle according to aspects of the invention.

FIG. 7 shows further details of the shell 502 for the avionics suite 500 mounted to and over the main tank 210, and the air steering pedals 510 mounted to the auxiliary tanks 220. This view provides a close-up view of the left steering pedal with an attachment 514 for connection to the airfoil disposed at the bottoms of the pedal. In this embodiment, the attachment for connection to the airfoil includes a pulley 516 through which a left air steering line 518 for the airfoil is run.

In embodiments, left and right steering lines may each be connected to the chassis and the airfoil, each steering line running through a pulley connected to the steering pedals. The air steering mechanism may also include a trim system configured to shorten an overall length of one or more of the steering lines. The trim system may be applied, for example, between the point where the steering line is connected to the chassis and the pulley, or between the pulley and the parachute attachment point. In embodiments, the trim system may be within reach of the pilot's hand, so that appropriate trim may be applied by the pilot during flight.

FIG. 7 also shows how parts of the front suspension 150 and shock absorbers 152 can be affixed to the main tank 210 and auxiliary tanks 220, respectively.

Figure 8:
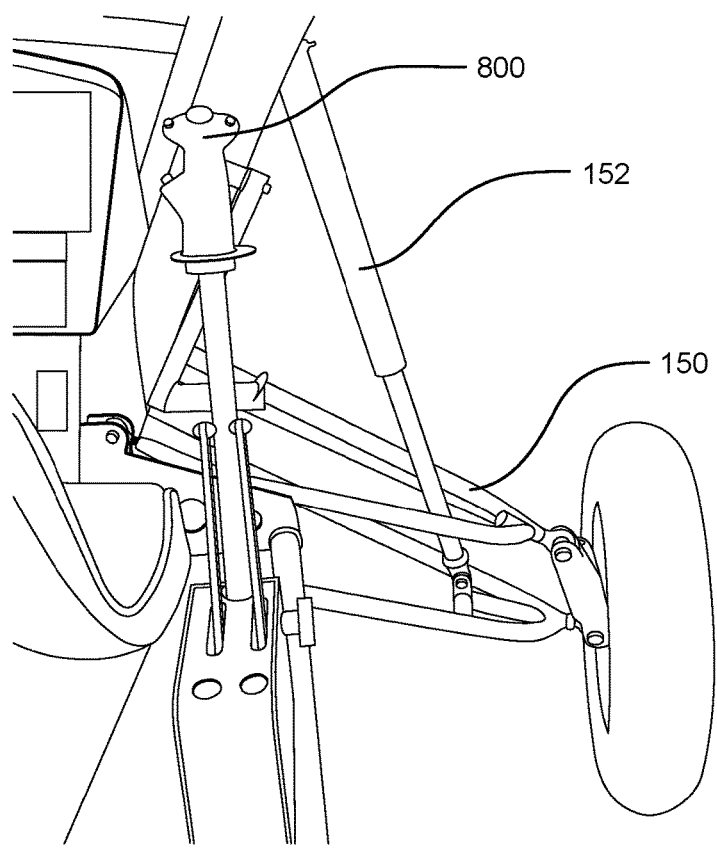
FIG. 8 depicts additional details of an air steering mechanism and front suspension of an exemplary vehicle according to aspects of the invention.

FIG. 8 shows further details of the front suspension 150 and shock absorbers 152 showing the significant range of motion of the shock absorbers in the active configuration. To the left of FIG. 8, the pilot/driver's hand can be seen on a ground steering mechanism 800 that may be configured to steer the wheels of the vehicle.

Figure 9:
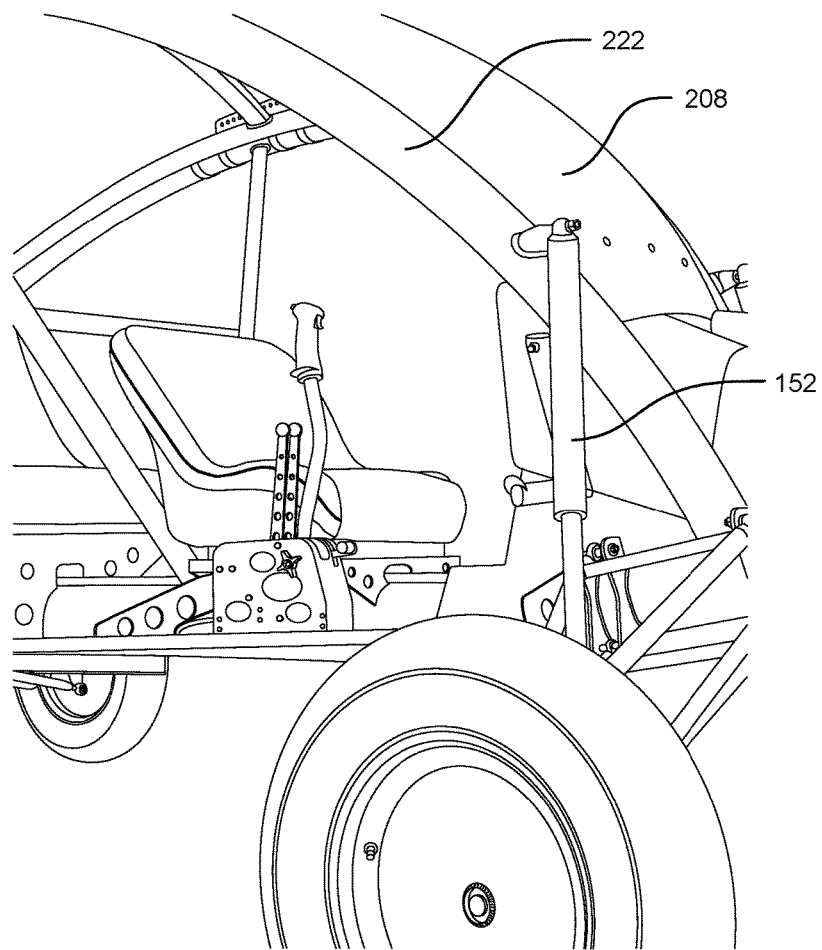
FIG. 9 depicts a right side view including details of a cockpit, frame, front windshield, and front suspension of an exemplary vehicle according to aspects of the invention.

FIG. 9 shows further details of the cockpit 130 and the shock absorbers 152 and windshield 208 attached to the auxiliary tanks 220.

Figure 10:
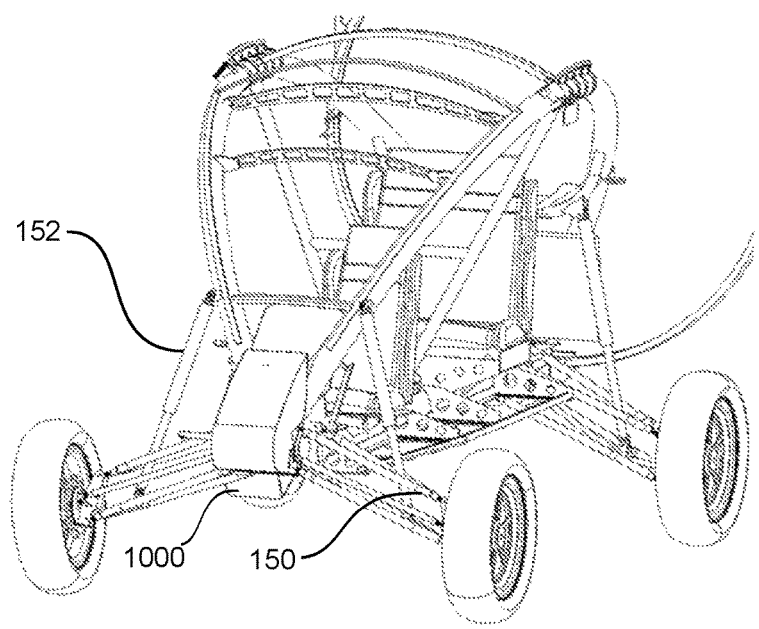
FIG. 10 depicts details of a frame and front suspension of an exemplary vehicle according to aspects of the invention.

FIG. 10 shows further details of the front suspension (including a rack and pinion steering system 1000) and shock absorbers 152 affixed to the main tank and auxiliary tanks, respectively. In embodiments, the rack and pinion steering 1000 may be connected to left and right steering levers as part of a ground steering mechanism 800 for the front wheels 154 of the vehicle.

In embodiments, the ground steering mechanism may include a locking mechanism for temporarily preventing the front wheels from steering. In embodiments, the locking mechanism releasably locks the front wheels 154 in a straight steering direction (e.g. for securing the wheels in the optimal position during flight, and releasing them for ground mobility).

Figure 11:
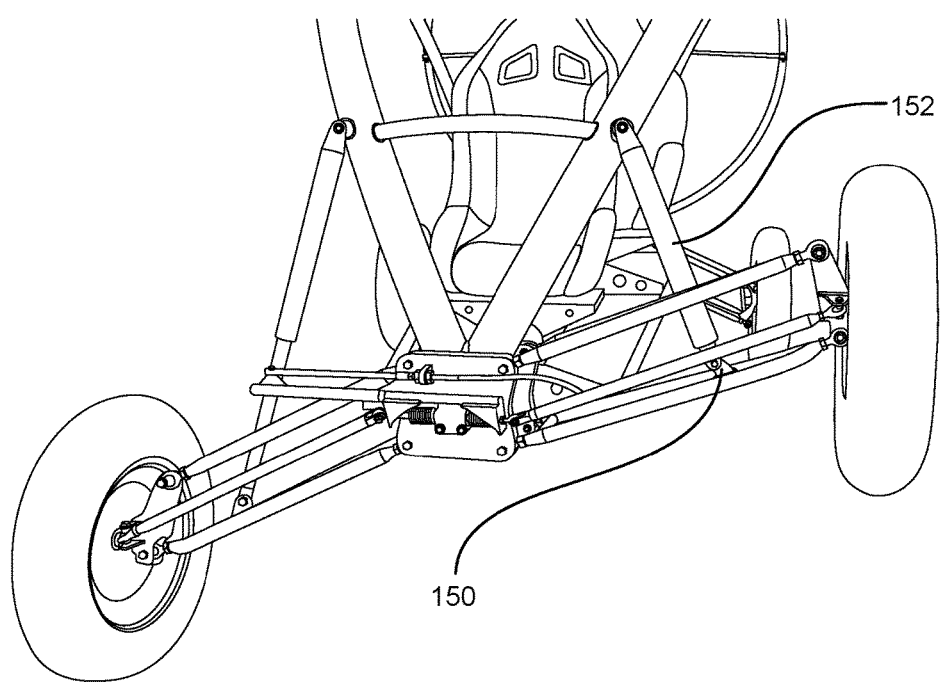
FIG. 11 depicts details of a frame and front suspension showing a range of motion for the front suspension of an exemplary vehicle according to aspects of the invention.

FIG. 11 shows further details of the front suspension 150 and shock absorbers 152, showing, in particular, the significant range of motion of the shock absorbers 152, e.g. over 12 inches, or over 16 inches.

In embodiments, the shock absorbing mechanism may be configured to transition between an active configuration and an inactive configuration, whereby the overall height of the vehicle can be reduced by about 12-20 inches, or about 16 inches.

Figure 12:
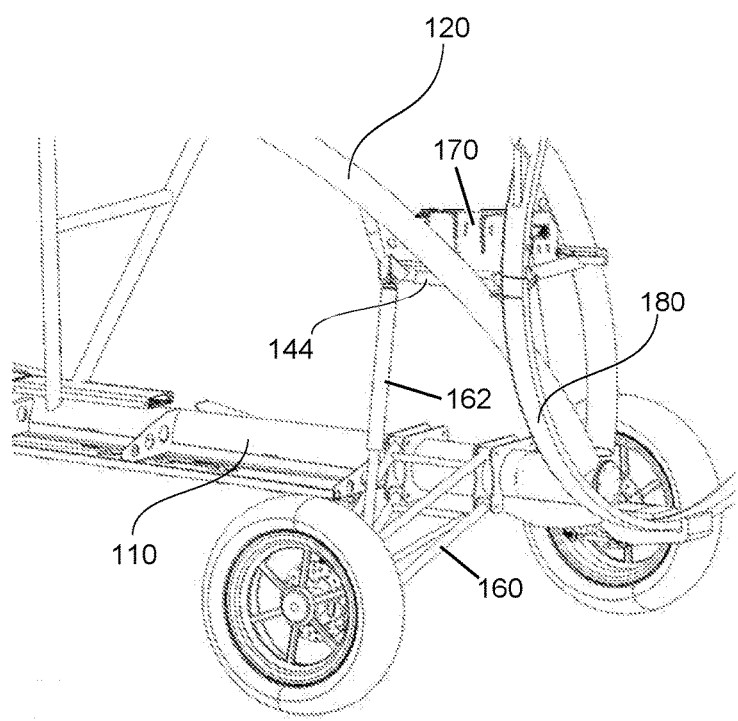
FIG. 12 depicts details of a frame, engine and rear suspension of an exemplary vehicle according to aspects of the invention.

FIG. 12 shows further details of the rear suspension 160 and shock absorbers 162 showing the rear suspension and shock absorbers affixed to the main tank 110 and auxiliary tanks 120, respectively. FIG. 12 further shows an engine 170 mounted above the main tank and between the auxiliary tanks, and a propeller hoop ring 180 (to the extreme right) mounted to the main tank and attached to the auxiliary tanks via support members 144.

Figure 13:
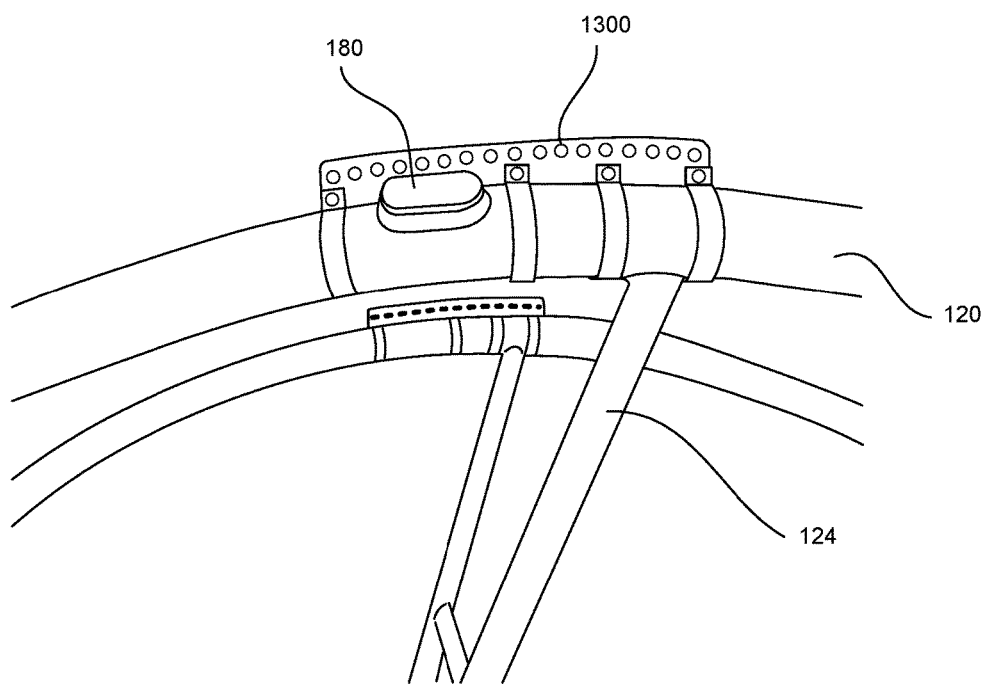
FIG. 13 depicts details of a frame, airfoil attachment, and auxiliary supports of an exemplary vehicle according to aspects of the invention.

FIG. 13 shows further details of an attachment mechanism, e.g. a parachute attachment point 1300, where the airfoil support may be attached to the auxiliary tanks 120, 122. As can be seen in FIGS. 1, 3, 13 and 14, embodiments may also include one or more elongated structural members 124 that connect the auxiliary tanks 120,122 to the main tank 110, wherein each of the auxiliary tanks may be connected to one of the structural members 124 at, or about, the attachment mechanism such that a lift force from the airfoil suspension is distributed to the main tank during flight.

In embodiments, the elongated structural members 124 may be connected to the central support forward of the attachment mechanism.

In embodiments, the elongated structural members 124 may be connected between the attachment mechanism and the central support at an angle closely approximating an average angle that the support cables assume with respect to the vehicle in flight.

Figure 14:
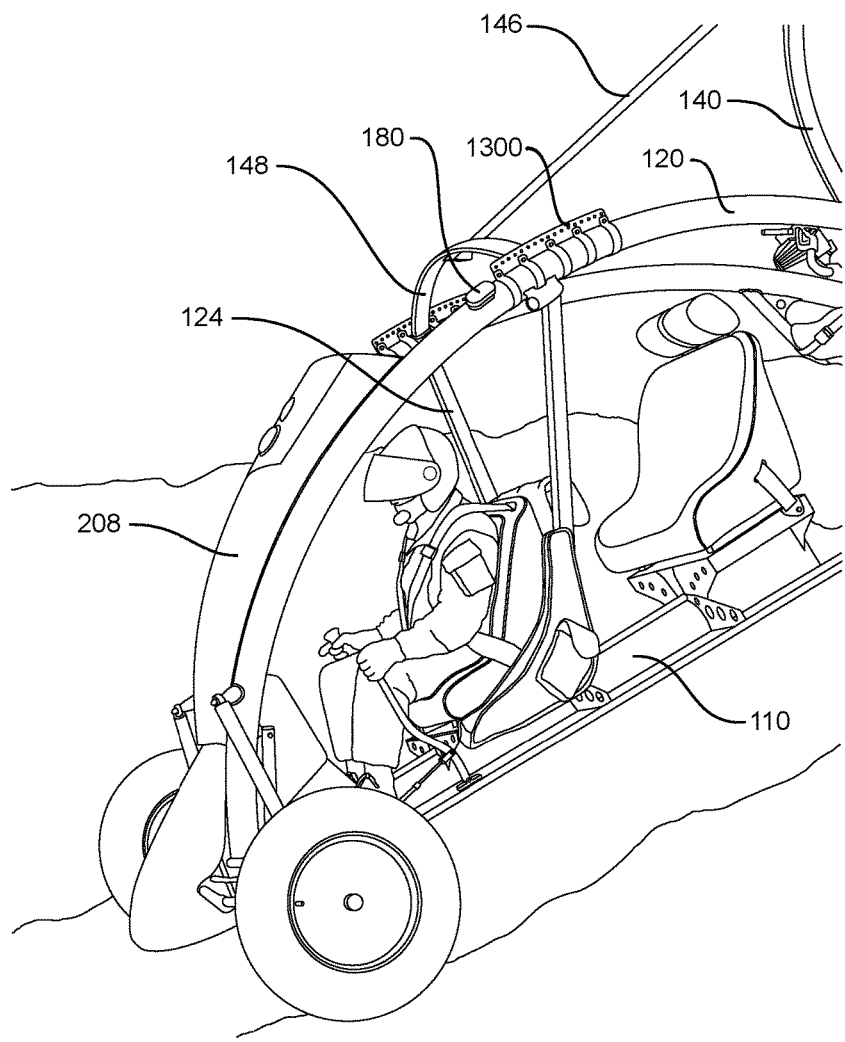
FIG. 14 depicts a left side view including details of a windshield, front wheels, cockpit, ground steering mechanism, and rear seating area, of an exemplary vehicle according to aspects of the invention.
Figure 15:
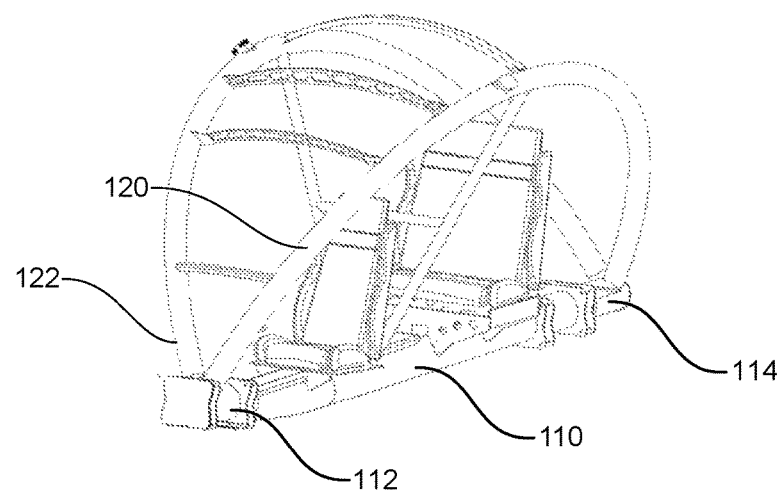
FIG. 15 depicts a front-left side view including details of a frame, cockpit, and rear seating area, of an exemplary vehicle according to aspects of the invention.

FIG. 14 also shows additional details regarding a windshield 208 mounted between the auxiliary tanks, an auxiliary support 146 connecting the propeller shroud 140 to a crossbrace 148 between the auxiliary tanks, and the elongated structural members 124 being connected to the main tank 110 forward of the attachment mechanisms.

FIGS. 15-19 all show various aspects of the main tank 110 disposed substantially along the centerline of the vehicle, and two auxiliary tanks 120, 122 extending upward and outward from the main tank 110. As can be seen, the main tank 110 and the at least two auxiliary tanks 120, 122 may be substantially tube-shaped, each of the two auxiliary tanks 120, 122 may be substantially arc-shaped, and/or each of the two auxiliary tanks 120, 122 may be attached to the main tank 110 at or about each end 112, 114 of the arc-shape.

As can be seen in FIG. 19, the chassis may include a central support 1910 extending along the centerline of the vehicle (e.g. similar to a backbone chassis), and the cage may include two elongated auxiliary supports 1920, 1922 that are connected to the central support at both ends 1912, 1914 of the central support.

In embodiments, the main fuel tank may hold approximately 10-30 gallons, or about 17 gallons, and/or each of the auxiliary tanks may hold approximately 5-15 gallons, or about 6 gallons. In embodiments, the main fuel tank may have a diameter of approximately 4-8 inches, or about 6 inches, and/or each of the auxiliary tanks may have a diameter of approximately 3-6 inches, or about 5 inches. The auxiliary tanks may each be configured with a fill port 180 at an approximate apex of the arc-shape.

Figure 16:
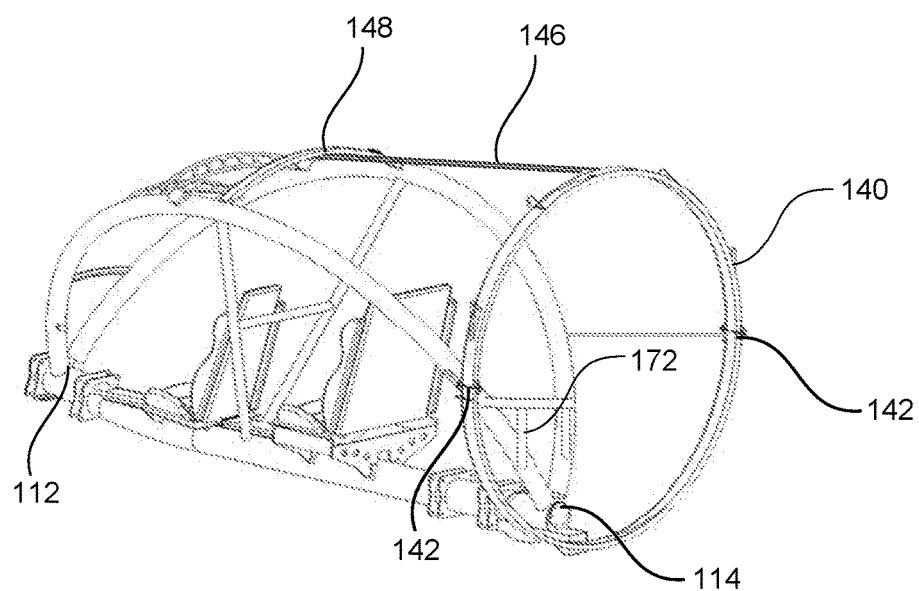
FIG. 16 depicts a rear-left view including details of a frame, engine mount, and propeller shroud of an exemplary vehicle according to aspects of the invention.

As shown in FIG. 16, the auxiliary tanks may also include a mount 172 for the engine attached thereto, and the propeller hoop ring 140 may include a pair of hinges 142 at about the middle of the hoop to allow folding of the hoop ring. The propeller hoop ring may be fixedly attached at the base to the main tank (or an extension 1930 of the main tank), and may further include supports 144 that attach to the auxiliary tanks or cross pieces that connect the auxiliary tanks to one another (see FIG. 19 also).

In embodiments, the auxiliary supports 1920, 1922 form a "V" shape and may be joined to the central support 1910 at the base of the "V" when viewed from the front of the vehicle.

Figure 17:
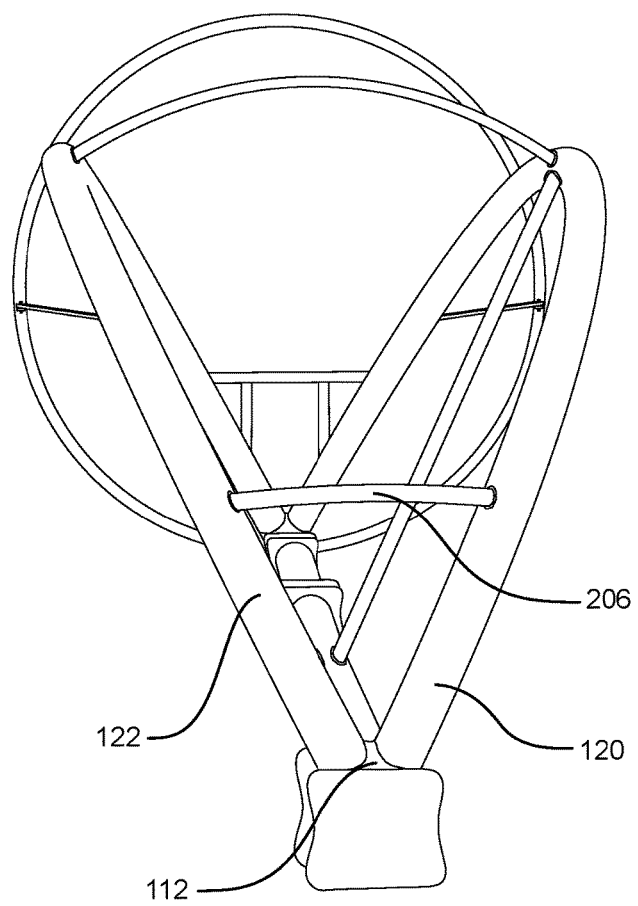
FIG. 17 depicts a depicts a front view including details of a frame and propeller shroud of an exemplary vehicle according to aspects of the invention.
Figure 18:
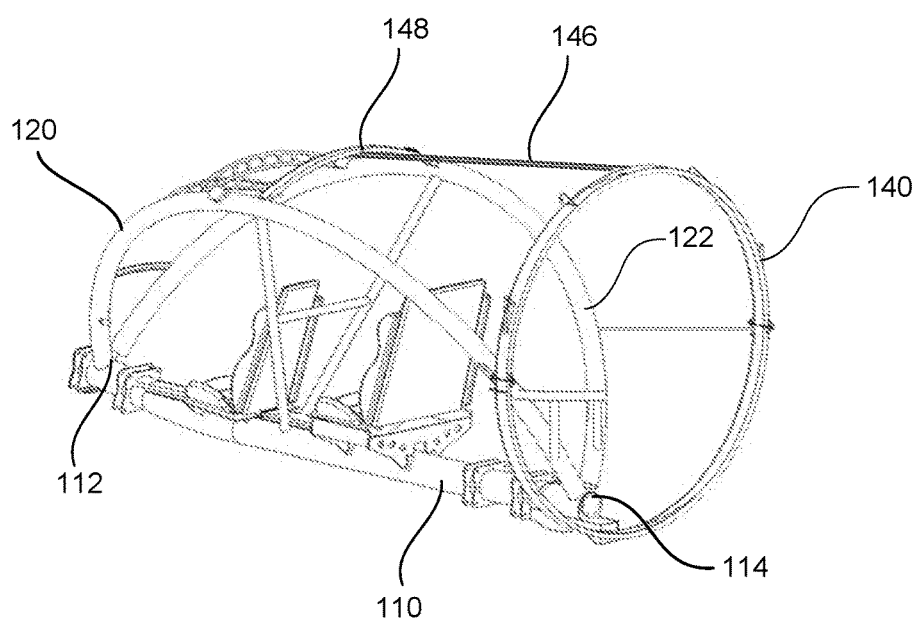
FIG. 18 depicts a rear-left view including details of a frame, engine mount, and propeller shroud of an exemplary vehicle according to aspects of the invention.

As shown in FIG. 17, the two auxiliary tanks 120, 122 may form a "V" shape and may be joined to the main tank 110 at the base of the "V" when viewed from the front (or rear) of the vehicle fame.

In embodiments, the two or more auxiliary tanks (may extend upward and outward from the main tank at an angle between 20° and 80° to horizontal, between 30° and 80° to horizontal, or between 60° and 80° to horizontal.

In embodiments, an apex of the arcs (or highest point of the arcs with respect to the height of the vehicle), may be located at about 40-60%, preferably about 50%, of the length of the vehicle, and/or a length of the arc.

FIG. 19 also provides a full view of how a fuel tank may be provided including a main tank; and at least two auxiliary tanks, wherein, the at least two auxiliary tanks extend upward and outward from the main tank, and the at least two auxiliary tanks may be substantially arc-shaped, and may be attached to the main tank at each end of the arc-shape.

In embodiments, each of the auxiliary supports 1920, 1922 include fuel reservoirs in fluid communication with a fuel reservoir in the central support 1910, the fuel reservoir in the central support in further fluid communication with the motor 170.

Figure 20:
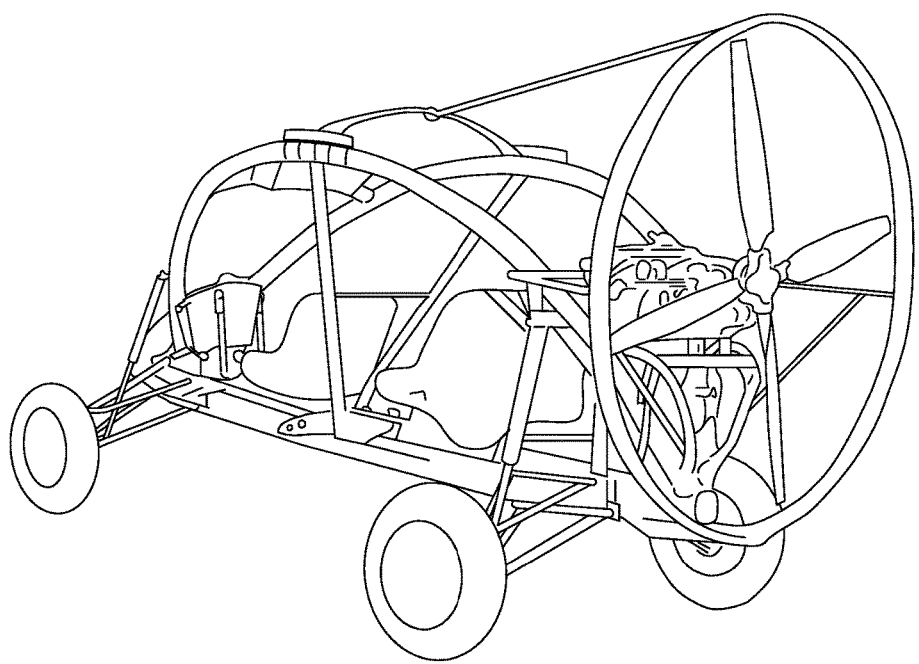
FIG. 20 depicts a rear-left view including details of an exemplary vehicle with an engine and propeller according to aspects of the invention.

FIG. 20 shows additional details regarding a more fully assembled vehicle include in the frame/tank of FIGS. 15-19, including the front and rear wheelbases, the engine and propeller.

FIG. 21 shows a close-up view of the propeller hoop ring 140 may be fixedly attached at the base to the main tank 110 (or an extension 1930 of the main tank).

In embodiments, the main tank may include a depression at the rear, and a fuel outlet in the depression. This may take the form, for example, of a scavenger tank attached to the bottom of the main tank, with access holes drilled in the bottom of the main tank. A fuel lead to the engine may be fed through the access holes and into the bottom of the scavenger tank. Alternatively, the main tank may be formed with a depression, or slope, toward the rear of the main tank, to allow scavenging of the maximum amount of fuel.

Figure 22:
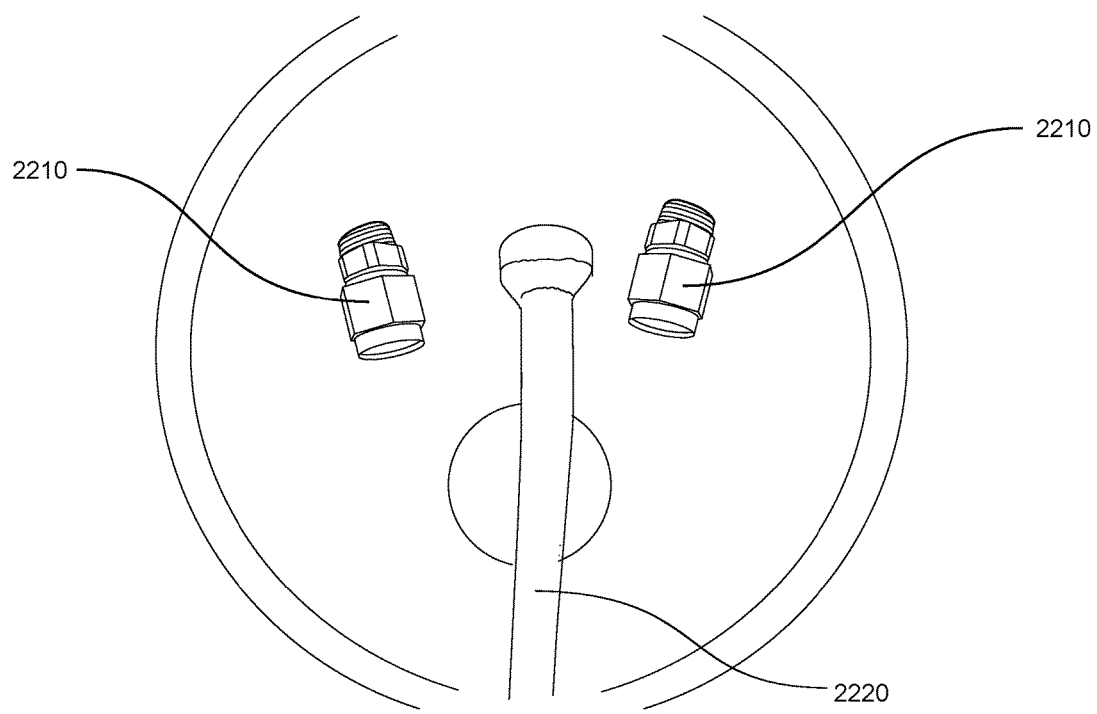
FIG. 22 depicts details inside an exemplary combination frame/fuel tank according to aspects of the invention.

In embodiments, each of the at least two auxiliary tanks may include a check valve, e.g. at, or about, each end. An example of two check valves 2210 through which fuel can flow from the two auxiliary tanks to the main tank is shown in FIG. 22. FIG. 22 is an internal view of the main tank 110, and also shows the fuel lead 2220 extending from the scavenger portion of the main tank, up and out of the main tank (which would lead to the engine). Each check valve 2210 may be configured to allow fuel to flow from the auxiliary tanks 120, 122 to the main tank 110 and impede fuel from flowing from the main tank 110 to the auxiliary tanks 120, 122.

Configuring the auxiliary tanks with these check valves may be beneficial, for example, in maintaining substantially equal amounts of fuel in each of the auxiliary tanks, thereby improving the sustained flight characteristics of the vehicle, and/or to prevent sloshing of the fuel into the auxiliary tanks during maneuvering, which could destabilize the vehicle.

In embodiments, the fuel tank may include open cell foam, or similar material, in the tanks. Such materials may be beneficial, for example, in reducing leak rates in the event of punctures to the tank, to baffle the fuel e.g. to reduce sloshing, and/or act as a fire retardant.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A ground vehicle with flight capability, comprising:
   a chassis;
   a cage attached to the chassis and including an attachment mechanism connected to a removable airfoil;
   a cockpit disposed substantially above the chassis and inside the cage and including a seat for a human pilot;
   a cargo area disposed rearward of the cockpit;
   a front wheelbase attached to the chassis and/or cage;
   a rear wheelbase attached to the chassis and/or cage;
   a ground steering mechanism connected to the front wheelbase and/or the rear wheelbase;
   a motor disposed rearward of the cargo area and connected to a propeller; and
   a propeller shroud at least partially encircling the propeller,
   wherein the chassis comprises a central support extending along the centerline of the vehicle, and the cage comprises two elongated auxiliary supports that are connected to the central support at both ends of the central support, and the auxiliary supports form a "V" shape and are joined to each end of the central support at the base of the "V" when viewed from the front of the vehicle;
   wherein each of the auxiliary supports include interior cavities that provide fuel reservoirs in fluid communication with a fuel reservoir in the central support, the fuel reservoir in the central support in further fluid communication with the motor.

2. The vehicle of claim 1, wherein the vehicle is configured for powered ground locomotion using the propeller with the airfoil detached, and configured for powered flight using the propeller with the airfoil attached.

3. The vehicle of claim 1, further comprising an air steering mechanism with an attachment for connection to the airfoil.

4. The vehicle of claim 3, wherein the air steering mechanism includes left and right steering pedals that are rotatatably secured at a top end of the pedals, and that are angled in toward a centerline of the vehicle.

5. The vehicle of claim 3, wherein the air steering mechanism includes left and right steering pedals that are angled in toward a centerline of the vehicle.

6. The vehicle of claim 5, wherein the left and right steering pedals are angled in toward the centerline of the vehicle in a range of 10° to 30° off vertical.

7. The vehicle of claim 3, wherein the air steering mechanism includes left and right steering pedals and attachments for connection to the airfoil are disposed at the bottoms of the pedals.

8. The vehicle of claim 7, wherein the air steering mechanism includes left and right steering lines that are each connected to the chassis and the airfoil, each steering line running through a pulley connected to the steering pedals.

9. The vehicle of claim 1, wherein the propeller shroud has a diameter in a range of approximately 70 inches to 80 inches.

10. The vehicle of claim 1, wherein the propeller shroud is disposed in a plane that is non-parallel to the plane of the propeller's rotation.

11. The vehicle of claim 1, wherein the propeller is bent at the ends, and the bent ends of the propeller do not extend beyond the propeller shroud.

12. The vehicle of claim 1, wherein the propeller's axis of rotation is non-parallel with the centerline of the vehicle.

13. The vehicle of claim 1, wherein the airfoil is a ram-air airfoil.

14. The vehicle of claim 1, wherein the auxiliary supports and the central support each extend along at least 80% of the length of the vehicle.

15. The vehicle of claim 1, wherein the two elongated auxiliary supports are arc-shaped, and the attachment mechanism includes attachment points for the airfoil at an apex of each of the arc-shaped auxiliary supports.

16. The vehicle of claim 1, further comprising an overhead control panel mounted to and between the auxiliary supports, the overhead control panel including at least one of an electrical hard point control, a circuit breaker, an engine monitor, an atmospheric indicator, or a performance indicator.

17. The vehicle of claim 1, wherein the cargo area includes a passenger seat for a human passenger.

18. A ground vehicle with flight capability, comprising:
 a backbone chassis including a including a central support extending along a centerline of the vehicle;
 a cage including two elongated auxiliary supports that are connected to the central support at both ends of the central support, the auxiliary supports forming a "V" shape and joined to each end of the central support at the base of the "V" when viewed from the front of the vehicle, the cage further including an attachment mechanism connected to a removable airfoil;
 a cockpit disposed substantially above the chassis and inside the cage and including a seat for a human pilot;
 a front wheelbase including two front wheels, suspension arms attached to the central support, and shock absorbers attached to the elongated auxiliary supports;
 a rear wheelbase including two rear wheels, suspension arms attached to the central support, and shock absorbers attached to the elongated auxiliary supports;
 a ground steering mechanism connected to the front wheelbase and/or the rear wheelbase;
 a motor disposed rearward of the cockpit and connected to a propeller; and
 a propeller shroud at least partially encircling the propeller;
 wherein each of the auxiliary supports include interior cavities that provide fuel reservoirs in fluid communication with a fuel reservoir in the central support, the fuel reservoir in the central support in further fluid communication with the motor.

* * * * *